United States Patent Office 3,296,011
Patented Jan. 3, 1967

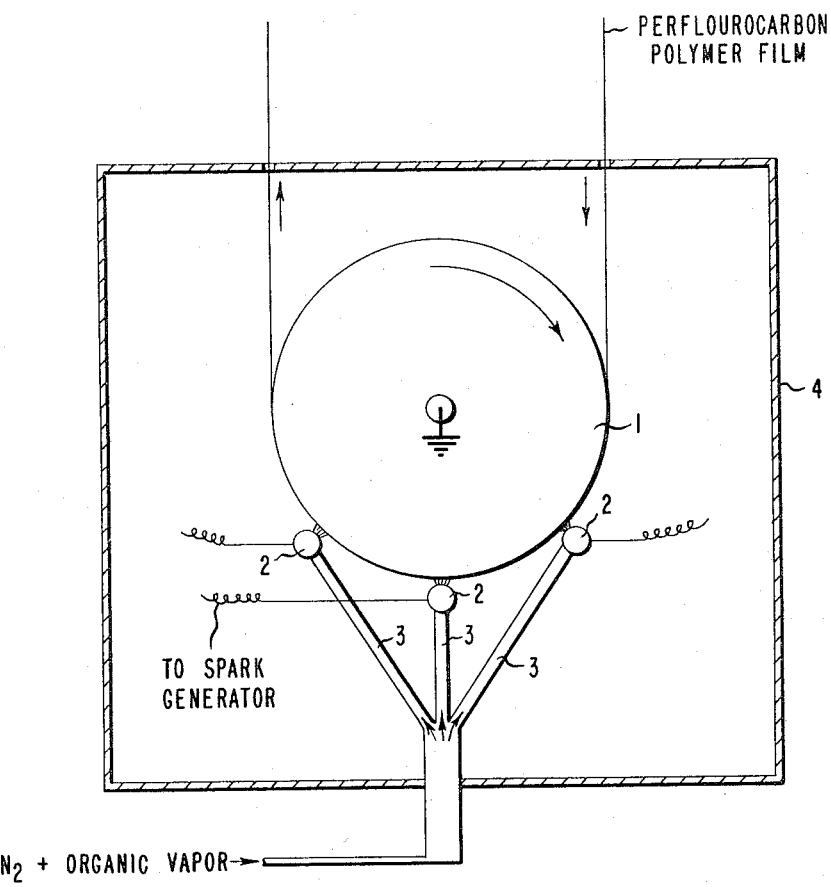

3,296,011
SURFACE TREATMENT OF PERFLUOROCARBON POLYMER STRUCTURES
Richard Thomas McBride and Leon Edward Wolinski, Buffalo, N.Y., assignors to E. I. du Pont de Nemours and Company, Wilmington, Del., a corporation of Delaware
Filed May 24, 1963, Ser. No. 282,947
14 Claims. (Cl. 117—47)

This application is a continuation-in-part of our copending United States application Serial No. 36,407, filed June 15, 1960, and now abandoned.

This invention relates to structures of polymeric perfluorocarbon, and more particularly to a process for rendering adherable the surfac of structures of a copolymer of tetrafluoroethylene and hexafluoropropene and to the improved structures resulting from the process.

Perfluorocarbon polymers are well known for their resistance to most chemicals and solvents. Their suitability for use as liners for pipes and vessels in which corrosive chemicals are transported or stored is at once apparent. However, the perfluorocarbon polymers suffer from an extremely low degree of adherability to all materials including low adherability to other perfluorocarbon polymeric structures. The use of the common adhesives does not provide adequate bonding of these polymers to anything. The use of an electric discharge treatment has been described in British Patent 715,914 for improving adhesion of inks to various polymeric films such as polyethylene, rubber hydrochloride, vinyl acetate/vinyl chloride copolymers and vinyl-modified butadiene/acrylonitrile copolymers. However, such an electrical discharge treatment of fluorocarbon surfaces has been found to provide little if any adherability to the treated surface. The use of high energy irradiation of polytetrafluoroethylene and polychlorotrifluoroethylene structures, on the other hand, has been observed to result in excessive degradation of the polymers. (D. S. Ballantine—SPE Journal*—July 1956—page 27; L. A. Wall—SPE Journal—March 1956—page 17.) Further, the use of high energy irradiation requires complicated and expensive irradiation equipment.

It is a principal object of this invention, therefore, to provide a process for the surface treatment of preformed structures of perfluorocarbon polymers whereby to render the surface adherable. Another object is to provide structures, particularly self-supporting films and film coatings of perfluorocarbon polymers which are readily adherable to other surfaces but which retain the useful and desirable properties which characterize perfluorocarbon polymer structures. A more specific object is to render the surfaces of preformed structures, e.g., films, of a copolymer of tetrafluoroethylene and hexafluoropropene adherable to other surfaces without deleteriously affecting the desirable properties of the copolymer. A still further object is to provide a continuous and economically attractive process for rendering the surface of films of a copolymer of tetrafluoroethylene and hexafluoropropene adherable to other surfaces. The foregoing and additional objects will more clearly appear from the description which follows.

These objects are realized by exposing the surface of a preformed structure of a copolymer of tetrafluoroethylene and hexafluoropropene to the action of an electrical discharge at substantially atmospheric pressure between spaced electrodes, said electrical discharge having an average energy level below 15 electron volts, in an atmosphere containing less than about 5% by volume of the vapor of an organic compound having a vapor pressure of at least 0.25 mm. of mercury at 60° C. in a gaseous carrier medium which will sustain the electrical discharge, whereby to render a surface of said film adherable to other materials. The permanency of the effect of this surface treatment is enhanced by subjecting the treated surface to a temperature of at least 150° C for a period of at least one hour, and/or by applying to said surface a polymeric coating.

The perfluorocarbon polymers with which this invention is specifically concerned are the resinous copolymers consisting essentially of from 95% to 50% by weight of tetrafluoroethylene and from 5% to 50% by weight of hexafluoropropene, the preparation and characteristics of which are described in United States Patent 2,833,686 (Sandt). The copolymers of this class containing hexafluoropropene within the weight range of from 7% to 27% constitute a preferred group of polymers highly useful in either the form of self-supporting film or as films in the form of coatings on substrates.

In the preferred embodiment of this invention, illustrated diagrammatically in the accompanying drawing, a continuous web of preformed self-supporting film is continuously passed between a set of spaced electrodes consisting of a rotating metal roll 1 which is connected electrically to ground, and one or more stationary hollow metal tubes 2 disposed parallel to the longitudinal axis of the roll and spaced a distance of from 0.03 to 0.125 of an inch from the surface thereof. The tubes are each connected electrically to a suitable power source which supplies to each tube electrode an alternating (or pulsating direct) current of from 0.3 to 5.5 R.M.S. (root mean square) amperes at a voltage in the range of 10,000 to 30,000 volts, with pulsating peak voltages up to 100,000 volts, and at a frequency in the range of from 300,000 to 500,000 cycles per second. A mixture of inert gas, i.e., a gas substantially free of oxygen gas, e.g., nitrogen, and vapors of non-oxidizing organic compound is continuously fed to the hollow interior of the electrode tubes through distributor ducts 3 and issues from the tubes at the gap between each tube and the roll through suitable openings along the length of the tubes, whereby the electrical discharge between the electrodes takes place in a non-oxidizing atmosphere containing the organic vapors. The vapors may also be introduced into the reaction zone through one or more tubes separate from the electrode assembly. The assembly just described is suitably enclosed in a chamber 4, held at atmospheric pressure and provided with the necessary openings, to facilitate maintenance of an oxygen gas-free atmosphere in the treating zone, and controlled exhaust of the mixture of nitrogen and organic vapors therefrom, and to minimize operational hazards. The treated film may be passed through a heating zone (not shown) and/or a coating apparatus (not shown) whereby to further condition the surface of the film to enhance the permanency of the adherency characteristics imparted to the film. It should be understood that the film may be treated at normal room temperatures or at elevated temperatures. In general the permanency of the effect of the treatment, i.e., adherability, is enhanced by maintaining the film at a temperature substantially above room temperature during treatment, e.g., at a temperature of from 50° to 100° C. or higher. In effect, the treatment at the higher temperature is realized by an in-line process wherein the film being extruded at high temperature is fed directly into the electric discharge treating apparatus before the film has had an opportunity to cool down to room temperature.

In order to render the surface of the polyfluorocarbon polymer structure adherable to other materials it is essential that the electrical discharge take place in substantially oxygen gas-free atmosphere containing in a minor proportion in a suitable gaseous carrier the vapors of a preferably non-oxidizing organic compound. For this purpose there may be employed any compound which

*Journal of the Society of Plastics Engineers.

is non-oxidizing under the conditions of the electrical discharge treatment, and which has a vapor pressure of at least 0.25 mm. of mercury at 60° C. While polymerizable organic substances are preferred, non-polymerizable organic monomers as well as polymerizable monomers may be used. As typical examples of suitable compounds there may be mentioned glycidyl methacrylate, methyl methacrylate, acrylonitrile, styrene, p-chlorostyrene, vinyl butyl ether, methyl vinyl ketone, vinyl acetate, 1-hexane, xylene, hexane, cyclohexane, carbon tetrachloride, chloroform, tetrahydrofuran, diethyl sulfone, N-vinyl-2-pyrrolidone, and tetraisopropyl titanate.

In the practice of this invention the potential difference between the electrodes may vary from very low voltages in the order of 1000 volts up to pulsating peak voltages of 100,000 and above. In general, voltages in excess of 2000–3000 are desired to bring about effective treatment of the surface to be made adherable.

Frequencies from 350 cycles per second up to 500,000 cycles per second or higher can be used and frequencies in the range of 300,000 to 500,000 cycles are preferred for rapid and effective treatment.

In general, the effectiveness of the treatment increases with amount of current to the electrodes for a given area of electrode and time of exposure. Current to the electrodes may range up to 5.5 R.M.S. (root mean square) amperes or higher. However, it is preferred to operate in the range of 0.3 R.M.S. ampere to 3.5 R.M.S. amperes to give reasonable treating times on the one hand, and to avoid rapid degradation of the electrodes at too high currents on the other hand. Power to the high frequency generator may range from 10 watts per lineal inch of the electrode length to 1800 watts per lineal inch of the electrode length. The electrical discharge employed herein, operating within the parameters above specified, has an average energy level below 15 electron volts, and is not to be confused with the high or intermediate energy irradiations heretofore used to treat polymeric surfaces.

Time of exposure to the electric discharge treatment is not especially critical and effective treatments are realized at exposure times as low as one second or less and no adverse effects are noted at times as long as 60 seconds. Longer exposure times can probably also be employed although for economic reasons exposure times as short as possible, consistent with effective treatment would normally be employed.

Preferably, the electrodes are spaced from about .03 inch to about 0.125 inch apart. However, useful results can be obtained when the electrodes gap is as low as .015 inch to as much as 0.25 inch provided suitable adjustments in such features as amount of current, electrode dimension and exposure time are made.

As noted previously, the presence of organic vapor in the space between the electrodes is a vital requirement in this process. A further requirement is that the organic vapor be employed as a dilute solution in a suitable carrier gas. In general, the concentration of the organic vapor in the carrier gas should not be greater than about 5% by volume. At higher concentrations unsatisfactory surface treating of the preformed structure results. The carrier gas should have characteristics such that it does not interfere with the maintenance of a continuous electrical discharge between the electrodes. Some gases with too low a breakdown potential may permit excessive arcing across the electrodes; those with too high dielectric strength tend to repress the electrical discharge. Particularly suitable carrier gases are nitrogen or carbon dioxide. Such gases as hydrogen or helium are also operable. Very satisfactory results have been obtained by bubbling nitrogen through the organic liquid to be vaporized at a rate of 240 cu. ft./hour and acceptable results were obtained at a gaseous flow rate as low as 30 cu. ft./hour. No adverse effects have been observed in the use of higher flow rates, though again, economic considerations would dictate against use of amounts exceeding those required to produce the desired effect.

The permanency of the effect produced on the surface of the polyfluorocarbon polymer structure by the electrical discharge treatment of this invention, i.e., the period of time that may elapse between the treatment and the effective application of the treated structure in the production of laminates and the like, is greatly improved by (1) heating the surface of the treated structure to a temperature of at least 150° C., for a period of at least one hour; or (2) by coating the surface of the freshly treated structure with a polymeric, and preferably an adhesive polymeric coating; or (3) by a combination of steps (1) and (2). Moreover, it has been found that a heat treatment, such as defined in step (1), serves to rejuvenate the adherability of electrical discharge-treated surfaces which have been stored for a long period of time prior to use.

The preferred polymeric adhesives for use in coating the treated polyfluorocarbon surface are the commercially available high molecular weight epoxy resins, e.g., "Epon" 1004 (resin from epoxidation of reaction product of bis-phenol-A and epichlorohydrin; has a melting point of 95°–105° C., and an epoxide equivalent of 875–1025, i.e., grams of resin containing one gram equivalent of epoxide), 1007 (melting point of 125°–135° C., and epoxide equivalent of 2000–2500) and 1009 (melting point of 145°–155° C., and epoxide equivalent of 2500 to 4000) from Shell Chemical Company. For making laminates to other surfaces, Bonding Agent R–313 (resin from epoxidation of reaction product of bis-phenol-A and epichlorohydrin; used with amine hardening agent) manufactured by the C. H. Biggs Company, Los Angeles, California gives very satisfactory results. Still other useful resins for this purpose are "Hysol" 2040 (resin from epoxidation of reaction product of bis-phenol-A and epichlorohydrin) made by Houghton Laboratories, Inc., Olean, New York, "Bondmaster" 648 (blend of phenolic resin and epoxy resin made by epoxidation of reaction product of bis-phenol-A and epichlorohydrin) made by Rubber & Asbestos Corp., Bloomfield, New Jersey; Raybond #86004 and #4134X13 (blends of phenolic resins and epoxy resins made by epoxidation of reaction product of bis-phenol-A and epichlorohydrin), Raybestos-Manhattan Corp., Bridgeport, Conn.; the acrylate adhesives disclosed in United States Patent 2,464,826; and the crotonate, methacrylate, alphachloroacrylate, sorbate and fumarate adhesives; silicon-based adhesives such as "Flexrock" #80 (silicone resin comprising aromatic and aliphatic siloxane units) made by Flexrock Company, Philadelphia, Pa., C–269 adhesive (silicone resin comprising aromatic and aliphatic siloxane units) made by Dow Corning Corp., Midland, Michigan; modified synthetic rubber-type adhesive such as 4684 (modified butadiene/acrylonitrile copolymer adhesive) and polyester-type adhesives such as 46950, 46960, 46970 and 46971 (copolyesters from condensation of ethylene glycol with mixtures of aromatic and aliphatic dicarboxylic acids) manufactured by E. I. du Pont de Nemours and Co., Wilmington, Delaware. In many instances satisfactory adhesion to other surfaces is obtained simply by means of heat and pressure, and without the application of additional laminating adhesive. It has been found that for some applications wherein an exceptionally strong adhesive bond is not required it is possible to heat bond the treated polyfluorocarbon film directly to another substrate such as paper without the use of a separate adhesive. For example, at a temperature of about 150° C. and at a pressure of 1000 p.s.i. for a time of about 10 seconds a film of treated polyfluorocarbon film, that is polyfluorocarbon film which has been subjected to an electrical discharge in an atmosphere of glycidyl methacrylate, can be directly laminated to paper. It is found, moreover, that if the film which has been subjected to the electrical discharge in the atmosphere of glycidyl methacrylate is further coated with an epoxy resin as described herein it can be laminated even more easily to paper by instantaneous pressure of 1000 p.s.i. and at a temperature of 150° C. A polyfluorocarbon film which has not been subjected to the electrical discharge in the atmosphere of glycidyl methacrylate cannot be laminated to paper under these conditions.

The following specific examples will serve to further illustrate the principles and practice of this invention.

*Example 1*

A film, 10 mils thick and 35 inches wide, melt extruded through a hopper slot at 385° C. from a tetrafluoroethylene/hexafluoropropene copolymer (weight ratio 85/15) of the type described by Bro and Sandt, in United States Patent application Serial No. 649,451, filed March 29, 1957, and now Patent No. 2,946,763 was passed at a speed of 5 feet per minute between a pair of electrodes at atmospheric pressure and connected to a high frequency spark generator (Model H.F.-S.G.—High Frequency Spark Generator—Lepel High Frequency Laboratories, Inc.), one electrode of which was stationary and the other was a rotating metal roll covered to a thickness of 20 mils with "Mylar"* polyester film. The electrodes were spaced .04 inch apart and the power setting of the generator was set at 55, corresponding to a current of approximately 0.9 R.M.S. ampere to the electrodes at a frequency of about 350,000 per second and at voltages in the range of 10,000 to 30,000 volts, with pulsating peak voltages up to 100,000 volts. An atmosphere of glycidyl methacrylate (approximately 0.5% by volume) and nitrogen was maintained between the electrodes by passing a stream of nitrogen (approximately 4 cu. ft./min.) through liquid glycidyl methacrylate and conducting the exit gases over the electrodes. As the film advanced beyond the pair of electrodes a thin layer of deposit could be observed on its surface. A coating of epoxy resin ("Epon" 1004—Shell Chemical Company) dissolved in methyl ethyl ketone then was sprayed on the surface. The coated film carrying 2 grams of the epoxy resin per square meter was then passed through a 12-foot dryer maintained at 80° C. at a speed of 40 feet per minute.

A series of tests was then run to determine adherability of the treated surface. To test the adherability of the treated surfaces an adhesive mixture containing R-313 epoxy resin and about 1% of an amine-type hardener (both obtained from Carl H. Biggs Co.) was applied to the surface of the perfluorocarbon film and to the surface of a strip of cold rolled steel. The surfaces bearing the adhesive were pressed together for 20 minutes at 70° C. at a pressure of 75 lbs./sq. inch. The laminate was then cooled to room temperature and bond strength was measured on a Suter tester at a 90° peel. A sample of treated film without the adhesive coating was included for comparison. The results are shown in Table I.

through an electric discharge but without the presence of the organic monomer vapors showed little adhesion in this test.

*Example 2*

The procedure of Example 1 was followed except that the extruded film in one experiment (a) contained 1% of weight, based on the total weight of the film, of titanium dioxide pigment uniformly distributed through the film, and in a second experiment (b) contained 0.5% by weight of carbon black as pigment. The treated films were adherent to strips of cold rolled steel and the resulting laminates were exposed to a band of ultraviolet sunlamps in air at 50° C. Bond strengths of these laminates are illustrated in the following table:

TABLE Ia

| Hours Exposure to U.V. Lamps | Peel Bond (gram/inch) | | |
| --- | --- | --- | --- |
| | Film of Experiment (a) | Film of Experiment (b) | Control Film (No Pigment) |
| 0 | Stronger than film. | Stronger than film. | Stronger than film. |
| 100 | 1,000 | ——do—— | 450. |
| 300 | 600 | ——do—— | 300. |

*Examples 3–11*

Following the procedure and using the same copolymer as described in Example 1, the following examples were carried out but with the compounds indicated below used in place of glycidyl methacrylate. The treated film was coated with Bonding Agent R-313, formed into a laminate as described in Example 1 and tested for adhesion.

| Example | Atmosphere | Laminate Bond Strength, g./in. |
| --- | --- | --- |
| 3 | N-vinyl-2-pyrrolidone | 9,000 |
| 4 | Acrylonitrile | 6,300 |
| 5 | p-Chlorostyrene | 3,000 |
| 6 | Toluene-2, 4-diisocyanate | 4,920 |
| 7 | Vinyl acetate | 4,820 |
| 8 | Xylene | 3,500 |
| 9 | Hexane | 3,400 |
| 10 | Carbon tetrachloride | 4,000 |
| 11 | Tetraisopropyl titanate | 3,600 |

*Example 12*

A 30-mil thick "Teflon"* FEP film (tetrafluoroethylene/hexafluoropropene copolymer) was advanced through an electric discharge at atmospheric pressure between two electrodes in an atmosphere of glycidyl methacrylate and nitrogen at a rate of one foot per minute. The film surface so treated was then immediately given a coating of Epon 1007 (Shell Chemical Company) and pressed on a strip of cold rolled steel carrying Bonding Agent R-313 adhesive. The bond strength by peeling of this laminate was about 4000 grams/inch. A section of this treated film (not resin coated) held for 41 days

TABLE I.—BOND STRENGTH OF CEMENTABLE SURFACES

| Hours [1] | Laminate Bond Strength (No adhesive coating), g./in. | Hours [1] | Laminate Bond Strength Coated Surface, g./in. | Hours [1] | Control (Electric Discharge only) Bond Strength, g./in. |
| --- | --- | --- | --- | --- | --- |
| 0 | 5,000–9,000 | 0 | 5,000–9,000 | 0 | 100–300 |
| 1,392 | Nil | 1,392 | 3,000 | | |

[1] Aging time before making laminate.

As shown in the table, the control film of the perfluorocarbon resin which had been given a treatment in air at room temperature before making the laminate showed almost no adhesion.

---

*Du Pont trademark.

Another sample of the treated film (uncoated) which had been aged at room temperature for 41 days was then held at 200° C. for 16 hours in air. A laminate to cold rolled steel was made using Bonding Agent R–313; a bond peel strength of 3000–5000 grams/inch was obtained.

As a further test of the effect of heating, samples of Teflon FEP film which had been submitted to the electric discharge treatment as described above were given the following treatments. One section was held in air at 200° C. overnight, one was held in air at 200° C. for one hour and the third sample was given no post-treatment. All three were held in air at room temperature for 53 days and were then laminated by means of Bonding Agent R–313. The results were as follows:

| Post-Treatment | Initial Bond, gm./in. | Bond after 53 days, gm./in. |
| --- | --- | --- |
| None | 3,000–5,000 | Nil plus spots at 2,000. |
| 200° C., 1 hour | 6,000–9,000 | 3,300–5,000. |
| 200° C., overnight | 3,000–5,000 | 4,000–6,000. |

In still another test, samples of film which had been post-treated by heating in air at 2000° C. for one hour and a film which had been given no post-heating treatment were treated in boiling methyl ethyl ketone for 16 hours and were then vacuum dried to remove residual solvent. The film which had been submitted to electric discharge but with no subsequent heat treatment had no visible coating and showed no wettability with water. The bonding strength in a laminate from this film was 1000–1500 grams/inch compared with a value of 3000–5000 grams/inch obtained before solvent treatment. Films that were heat treated at one hour had a hard visible coating after the extraction and bond strengths of laminates made from these films were 2000–3000 grams/inch compared to an initial bond of 3000–5000 grams/inch.

*Example 13*

Following the procedure of Example 1, a film of trifluorochloroethylene polymer was exposed to an electrical discharge at atmospheric pressure in an atmosphere of nitrogen and glycidyl methacrylate vapor. The electric discharge treated film was coated with Epon 1009 adhesive and was made into a steel laminate with the same adhesive. The laminate showed a bond strength of 2000 grams/inch.

*Example 14*

A 20 mil coating of the tetrafluoroethylene/hexafluoropropene copolymer, described in Example 1, was extruded on 24 gauge copper wire at a temperature of approximately 395° C. The resulting coated wire was drawn through the electric discharge apparatus of Example 1 at a rate of 5 feet per minute. The electrodes were spaced .09 inch apart and the rotating roll was covered to a thickness of 20 mils with "Mylar" polyester film. An atmosphere of nitrogen and xylene vapor was maintained between the electrodes.

The coated wire was drawn through the apparatus a second time with the wire rotated 180° about its machine direction axis to insure complete circumferential treatment. The coated wire, so treated, was then drawn through an 11% methyl ethyl ketone solution of Epon 1004 resin (Shell Chemical Company) containing 5%, based on the weight of the Epon 1004 resin, of tetraethylene pentamine as curing agent. Thereafter, the coated wire carrying about 0.1 mil of Epon resin on its surface was heated in an oven at 140° C. for one minute.

To test the adhesion of the Epon resin to the treated perfluorocarbon surface, a strip of Scotch Tape was pressed onto the surface and then removed with a sharp jerk. There was no indication of peeling of the Epon resin from the perfluorocarbon surface.

The treated and Epon resin coated wire composite was adhered to a surface of cold rolled steel by applying to both surfaces to be joined an adhesive mixture containing R–313 epoxy resin and 1% of an amine type hardener (both obtained from Carl H. Biggs Co.). The surfaces bearing the adhesive were pressed together for 20 minutes at 70° C. at a pressure of about 75 lbs./sq. inch, after which the assembly was cooled to room temperature. The coated wire was firmly bonded to the steel surface.

As a control, a copper wire coated with the tetrafluoroethylene/hexafluoropropene copolymer but not submitted to the electric discharge treatment in an atmosphere of nitrogen and a non-oxidizing organic vapor showed very poor wettability when drawn through the methyl ethyl ketone solution of the Epon 1004 resin and shown essentially no adhesion to the steel surface with the R–313 epoxy resin adhesive.

Essentially the same results were obtained when the tetrafluoroethylene/hexafluoropropene copolymer coating on the wire was replaced by trifluorochloroethylene polymer.

By the process of this invention, the perfluorocarbon structures such as that of the copolymer of tetrafluoroethylene and hexafluoropropene and that of trifluorochloroethylene are rendered adherable to various surfaces such as metals including aluminum, iron, copper, magnesium, nickel, tin, lead and alloys thereof; glass; cellulose structures such as wood, regenerated cellulose film; and other polymeric structures such as polyesters, polyamides, and polymers of other halogenated olefins. Further, the process of this invention is continuous, and can be adapted for use in large scale manufacturing operations.

The superb combination of chemical, electrical, thermal, mechanical and weathering properties of products fabricated from these polyfluorocarbon films lead to broad application in such basic and important industries as aircraft, missile, electronic and electrical, food and kindred products, automotive, chemical, machinery, petroleum, textile, rubber and many others. Typical examples of uses for film processed in accordance with this invention are: flexible cable insulation, printed circuitry, diaphragms, gaskets, seals, pipe and hose covers, roll covers, tank and pipe linings, fuel cells, sinks, mold release systems, ice release systems, anti-stick uses, diffusion separators, refrigerator trays, baking pans, pressure-sensitive tape, conveyor belt surfaces, etc.

We claim:
1. A process which comprises continuously passing a continuous film of a copolymer of tetrafluoroethylene and hexafluoropropene containing from 95% to 50% by weight of tetrafluoroethylene and from 5% to 50% of hexafluoropropene, between positive and negative electrodes spaced a distance from about 0.015 to about 0.25 of an inch apart, continuously applying to said positive electrode an alternating current at a voltage within the range of from 10,000 to 30,000 volts, and at a frequency in the range of from 300,000 to 500,000 cycles per second, and maintaining between said electrodes a substantially oxygen gas-free atmosphere containing less than about 5% by volume of the vapors of a non-oxidizing organic compound having a vapor pressure of at least 0.25 millimeter of mercury at 60° C. in a gaseous carrier medium which will sustain said electrical discharge, whereby to render a surface of said film adherable to other materials, and thereafter coating said surface with a polymeric coating.

2. A process which comprises continuously passing a a continuous film of a copolymer of tetrafluoroethylene and hexafluoropropene containing from 95% to 50% by weight of tetrafluoroethylene and from 5% to 50% of hexafluoropropene, between positive and negative electrodes spaced a distance from about 0.015 to about 0.25 of an inch apart, continuously applying to said positive electrode an alternating current at a voltage within the range of from 10,000 to 30,000 volts, and at a frequency in the range of from 300,000 to 500,000 cycles per second, and maintaining between said electrodes a substantially oxygen gas-free atmosphere containing less than about 5% by volume of the vapors of a non-oxidizing organic compound having a vapor pressure of at least 0.25 millimeter of mercury at 60° C. in a gaseous carrier medium which will sustain said electrical discharge, whereby to render a surface of said film adherable to other materials, and thereafter coating said surface with an adhesive polymeric coating.

3. The process of claim 2 wherein the adhesive polymeric coating is an epoxy resin.

4. A process which comprises continuously passing a continuous film of a copolymer of tetrafluoroethylene and hexafluoropropene containing from 95% to 50% by weight of tetrafluoroethylene and from 5% to 50% of hexafluoropropene, between positive and negative electrodes spaced a distance from about 0.015 to about 0.25 of an inch apart, continuously applying to said positive electrode an alternating current at a voltage within the range of from 10,000 to 30,000 volts, and at a frequency in the range of from 300,000 to 500,000 cycles per second, and maintaining between said electrodes a substantially oxygen gas-free atmosphere containing less than about 5% by volume of the vapors of a non-oxidizing organic compound having a vapor pressure of at least 0.25 millimeter of mercury at 60° C. in a gaseous carrier medium which will sustain said electrical discharge, whereby to render a surface of said film adherable to other materials, and thereafter subjecting said surface to a temperature of at least 150° C., for a period of at least one hour.

5. A process which comprises continuously passing a continuous film of a copolymer of tetrafluoroethylene and hexafluoropropene containing from 95% to 50% by weight of tetrafluoroethylene and from 5% to 50% of hexafluoropropene, between spaced positive and negative electrodes, the negative electrode being a rotating roll over which the film passes, and the positive electrode being at least one elongated conductor aligned with its longitudinal axis parallel to the longitudinal axis of the roll and spaced a distance of from about 0.015 to about 0.25 of an inch from the surface of said roll, continuously applying to said positive electrode an alternating current at a voltage within the range of from 10,000 to 30,000 volts, and at a frequency in the range of from 300,000 to 500,000 cycles per second, and maintaining between said electrodes a substantially oxygen gas-free atmosphere containing less than about 5% by volume of the vapors of a non-oxidizing organic compound having a vapor pressure of at least 0.25 millimeter of mercury at 60° C. in a gaseous carrier medium which will sustain said electrical discharge, whereby to render a surface of said film adherable to other materials..

6. The process of claim 5 wherein said atmosphere consists of nitrogen and vapor of glycidyl methacrylate.

7. A process which comprises continuously passing a continuous film of a copolymer of tetrafluoroethylene and hexafluoropropene containing from 95% to 50% by weight of tetrafluoroethylene and from 5% to 50% of hexafluoropropene, between spaced positive and negative electrodes, the negative electrode being a rotating roll over which the film passes, and the positive electrode being at least one elongated conductor aligned with its longitudinal axis parallel to the longitudinal axis of the roll and spaced a distance of from about 0.015 to about 0.25 of an inch from the surface of said roll, continuously applying to said positive electrode an alternating current at a voltage within the range of from 10,000 to 30,000 volts, and at a frequency in the range of from 300,000 to 500,000 cycles per second, and maintaining between said electrodes a substantially oxygen gas-free atmosphere containing less than about 5% by volume of the vapors of a non-oxidizing organic compound having a vapor pressure of at least 0.25 millimeter of mercury at 60° C. in a gaseous carrier medium which will sustain said electrical discharge, whereby to render a surface of said film adherable to other materials, and thereafter coating said surface with an adhesive polymeric coating.

8. The process of claim 7 wherein the adhesive polymeric coating is an epoxy resin.

9. A process which comprises continuously passing a continuous film of a copolymer of tetrafluoroethylene and hexafluoropropene containing from 95% to 50% by weight of tetrafluoroethylene and from 5% to 50% of hexafluoropropene, between spaced positive and negative electrodes, the negative electrode being a rotating roll over which the film passes, and the positive electrode being at least one elongated conductor aligned with its longitudinal axis parallel to the longitudinal axis of the roll and spaced a distance of from about 0.015 to about 0.25 of an inch from the surface of said roll, continuously applying to said positive electrode an alternating current at a voltage within the range of from 10,000 to 30,000 volts, and at a frequency in the range of from 300,000 to 500,000 cycles per second, and maintaining between said electrodes a substantially oxygen gas-free atmosphere containing less than about 5% by volume of the vapors of a non-oxidizing organic compound having a vapor pressure of at least 0.25 millimeter of mercury at 60° C. in a gaseous carrier medium which will sustain said electrical discharge, whereby to render a surface of said film adherable to other materials, and thereafter subjecting said surface to a temperature of at least 150° C., for a period of at least one hour.

10. A process which comprises exposing the surface of a shaped structure of a copolymer of tetrafluoroethylene and hexafluoropropene to the action of an electrical discharge at substantially atmospheric pressure between spaced electrodes, said electrical discharge having an average energy level below 15 electron volts, in a substantially oxygen gas-free atmosphere containing less than about 5% by volume of the vapor of an organic compound which is non-oxidizing under the conditions of the electrical discharge and having a vapor pressure of at least 0.25 mm. of mercury at 60° C. in a gaseous carrier medium which will sustain said electrical discharge whereby to render a surface of said shaped structure adherable to other materials.

11. A process which comprises exposing the surface of a shaped structure of a copolymer of tetrafluoroethylene and hexafluoropropene to the action of an electrical discharge at substantially atmospheric pressure between electrodes spaced a distance of about 0.015 to about 0.25 of an inch apart, continuously applying to said electrodes an alternating current at a voltage in excess of 1000 volts and at a frequency in excess of 350 cycles per second, said electrical discharge having an average energy level below 15 electron volts, in a substantially oxygen gas-free atmosphere containing less than 5% by volume of the vapor of an organic compound which is non-oxidizing under the conditions of the electrical discharge and having a vapor pressure of at least 0.25 mm. of mercury at 60° C. in a gaseous carrier medium which will sustain said electrical discharge whereby to render a surface of said shaped structure adherable to other materials.

12. A shaped structure of a copolymer of tetrafluoroethylene and hexafluoropropene containing from 95% to 50% by weight of tetrafluoroethylene and from 5% to 50% of hexafluoropropene, a surface of which has been treated by the process of claim 11.

13. A process which comprises continuously passing a continuous film of a copolymer of tetrafluoroethylene and hexafluoropropene containing from 95% to 50% by weight of tetrafluoroethylene and from 5% to 50% of hexafluoropropene, between positive and negative electrodes, spaced a distance from about 0.015 to about 0.25 of an inch apart, continuously applying to said positive electrode an alternating current at a voltage within the range of from 1000 to 100,000 volts, and at a frequency in the range of from 350 to 500,000 cycles per second effective to create an electrical discharge between said spaced electrodes, and maintaining between said electrodes a substantially oxygen gas-free atmosphere containing less than about 5% by volume of the vapors of non-oxidizing organic compound having a vapor pressure of at least 0.25 millimeter of mercury at 60° C. in a gaseous carrier medium which will sustain said electrical discharge, whereby to render a surface of said film adherable to other materials.

14. The process of claim 13 wherein said atmosphere consists of nitrogen and vapor of glycidyl methacrylate.

References Cited by the Examiner

UNITED STATES PATENTS 2,859,480 11/1958 Berthold et al. _____ 250—49.5
2,864,755 12/1958 Rothacker _____ 204—165

FOREIGN PATENTS 801,531 9/1958 Great Britain.
1,181,893 1/1959 France.

ALFRED L. LEAVITT, *Primary Examiner.*

MURRAY KATZ, *Examiner.*

A. GOLIAN, *Assistant Examiner.*